(12) United States Patent
Brooks et al.

(10) Patent No.: US 8,889,097 B2
(45) Date of Patent: Nov. 18, 2014

(54) COMBINED ON-BOARD HYDRIDE SLURRY STORAGE AND REACTOR SYSTEM AND PROCESS FOR HYDROGEN-POWERED VEHICLES AND DEVICES

(75) Inventors: Kriston P. Brooks, Kennewick, WA (US); Jamelyn D. Holladay, Kennewick, WA (US); Kevin L. Simmons, Kennewick, WA (US); Darrell R. Herling, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 371 days.

(21) Appl. No.: 13/346,613

(22) Filed: Jan. 9, 2012

(65) Prior Publication Data

US 2012/0174984 A1    Jul. 12, 2012

Related U.S. Application Data

(60) Provisional application No. 61/431,288, filed on Jan. 10, 2011.

(51) Int. Cl.
| | | |
|---|---|---|
| *C10L 9/04* | (2006.01) | |
| *C01B 3/04* | (2006.01) | |
| *C01B 3/00* | (2006.01) | |
| *C01B 3/06* | (2006.01) | |
| *H01M 8/04* | (2006.01) | |
| *H01M 8/06* | (2006.01) | |

(52) U.S. Cl.
CPC .............. *C01B 3/0073* (2013.01); *C01B 3/065* (2013.01); *H01M 8/04216* (2013.01); *H01M 8/065* (2013.01); *Y02E 60/324* (2013.01); *Y02E 60/362* (2013.01)
USPC .......................... 423/648.1; 206/0.7; 423/644

(58) Field of Classification Search
CPC ..................................... C01B 3/00; C01B 3/02
USPC ............................... 206/0.07; 423/648.1, 644
See application file for complete search history.

(56) References Cited

U.S. PATENT DOCUMENTS

| 7,128,997 B2 | 10/2006 | Harding et al. | |
| 2004/0035054 A1* | 2/2004 | Mohring et al. | 48/61 |

(Continued)

FOREIGN PATENT DOCUMENTS

| JP | 06234501 | 8/1994 |
| WO | 2010087698 A2 | 8/2010 |
| WO | WO 2010087698 A3 * | 1/2011 |

OTHER PUBLICATIONS

Muster, T. H., et al., Rheological Investigations of Sulphide Mineral Slurries, Minerals Engineering, vol. 8, No. 12, 1995, pp. 1541-1555.

(Continued)

*Primary Examiner* — Stanley Silverman
*Assistant Examiner* — Syed Iqbal
(74) *Attorney, Agent, or Firm* — James D. Matheson

(57) ABSTRACT

An on-board hydride storage system and process are described. The system includes a slurry storage system that includes a slurry reactor and a variable concentration slurry. In one preferred configuration, the storage system stores a slurry containing a hydride storage material in a carrier fluid at a first concentration of hydride solids. The slurry reactor receives the slurry containing a second concentration of the hydride storage material and releases hydrogen as a fuel to hydrogen-power devices and vehicles.

6 Claims, 5 Drawing Sheets

(56) References Cited

U.S. PATENT DOCUMENTS

| | | | |
|---|---|---|---|
| 2004/0052722 A1* | 3/2004 | Jorgensen et al. | 423/648.1 |
| 2007/0227899 A1 | 10/2007 | McClaine et al. | |
| 2010/0055517 A1* | 3/2010 | Uzhinsky et al. | 429/17 |
| 2011/0286913 A1* | 11/2011 | Lugtigheid | 423/658.2 |

OTHER PUBLICATIONS

Davis, R. M., et al., Mechanical Alloying of Brittle Materials, Metallurgical Transactions A, vol. 19A, Dec. 1988, pp. 2867-2874.

Suryanarayana, C., Mechanical Alloying and Milling, Progress in Materials Science 46, 2001, pp. 1-184.

Bernhardt, C., et al., The Influence of Suspension Properties on Ultra-File Grinding in Stirred Ball Mills, Powder Technology, 105, 1999, pp. 357-361.

Huot, J., et al., Structural Study and Hydrogen Sorption Kinetics of Ball-Milled Magnesium Hydride, Journal of Alloys and Compounds, 293-295, 1999, pp. 495-500.

Greenwood, R., et al., A New Method for Determining the Optimum Dispersant Concentration in Aqueous Grinding, Powder Technology, 123, 2002, pp. 199-207.

Cal-Prieto, M. J., et al., Slurry Sampling for Direct Analysis of Solid Materials by Electrothermal Atomic Absorption Spectrometry (ETAAS). A Literature Review from 1990 to 2000, Talanta, 56, 2002, pp. 1-51.

He, M., et al., Slurry Rheology in Wet Ultrafine Grinding of Industrial Minerals: A Review, Powder Technology, 147, 2004, pp. 94-112.

Hanada, N., et al., Catalytic Effect of Nanoparticle 3d-Transition Metals on Hydrogen Storage Properties in Magnesium Hydride MgH2 Prepared by Mechanical Milling, J. Phys. Chem. B, 109, 2005, pp. 7188-7194.

Mulas, G., et al., Hydriding Kinetics and Process Parameters in Reactive Milling, Journal of Alloys and Compounds, 404-406, 2005, pp. 353-346.

McClaine, A. W., et al., Chemical Hydride Slurry for Hydrogen Production and Storage, 2005 DOE Hydrogen Program Review Presentation, May 24, 2005.

Suslick, K. S., et al., Inside a Collapsing Bubble: Sonoluminescence and the Conditions During Cavitation, Annu. Rev. Phys. Chem., 59, 2008, pp. 659-683.

Suslick, K. S., Sonochemistry, Science 247, 1990, pp. 1439-1445.

Gregory, J., Solid/Liquid Dispersions: Flocculation by Polymers and Polyelectrolytes, Th.F. Tadros (Ed.), Academic Press, London, 1987, Chapter 8.

Orumwense, O. A., et al., Superfine and Ultrafine Grinding—A Literature Survey, Mineral Processing and Extractive Metallurgy Review 11, 1992, pp. 107-127.

International Search Report/Written Opinion for International Application No. PCT/US2012/020803, International Filing Date Jan. 10, 2012, Date of Mailing Apr. 2, 2012.

English Abstract for Japanese Publication No. 06234501, Publication Date Aug. 23, 1994.

Breault, R. W., et al., Advanced Chemical Hydride-Based Hydrogen Generation/Storage System for Fuel Cell Vehicles, Proceedings of the 1998 U.S. Doe Hydrogen Program Review, NREL/CP-570-25314.

* cited by examiner

COMBINED ON-BOARD HYDRIDE SLURRY STORAGE AND REACTOR SYSTEM AND PROCESS FOR HYDROGEN-POWERED VEHICLES AND DEVICES

CROSS REFERENCE TO RELATED APPLICATION

This application claims priority from U.S. Provisional Patent Application No. 61/431,288 filed 10 Jan. 2011 entitled "Variable Concentration Slurry Reactor System and Fixed Bed Reactor for Externally Regenerated Chemical Hydride System", which reference is incorporated herein in its entirety.

STATEMENT REGARDING RIGHTS TO INVENTION MADE UNDER FEDERALLY-SPONSORED RESEARCH AND DEVELOPMENT

This invention was made with Government support under Contract DE-AC05-76RLO-1830 awarded by the U.S. Department of Energy. The Government has certain rights in the invention.

FIELD OF THE INVENTION

The invention relates generally to hydrogen storage technologies and more particularly to an integrated storage and reactor system and process for storing and reacting variable concentration slurries containing hydride storage materials that release hydrogen on-board vehicles and devices.

BACKGROUND OF THE INVENTION

Chemical hydrides are being investigated to provide hydrogen gas for hydrogen-powered vehicles. A disadvantage of most existing chemical hydrides is that they must be regenerated off board from the vehicle. Thus, in typical vehicle systems, the chemical hydride material must be moved onto the vehicle, stored, processed through a reactor, stored as spent product and then removed. These systems require a large amount of storage space and storage equipment. The United States Department of Energy (DOE) has provided aggressive volumetric and gravimetric targets that constrain the amounts of storage space allowed for such systems. Typical reactor systems are unsuitable for use in vehicles because exothermic reaction heats associated with chemical hydrides produce high temperatures that result in unwanted reaction byproducts and a need for specialty reactor materials. Diluents that prevent reactors from overheating may be a viable approach to controlling temperatures, but at required concentrations, diluents can impose additional weight and volume penalties that prevent their use. And, some hydrides react endothermically, which adds a requirement to a heat source as an equipment constraint to already burdensome weight issues of on-board vehicle systems. Therefore, materials and systems are needed that allow creation and use of such materials that provide desired advantages but eliminate unwanted effects and consequences typical of conventional reactor systems and materials. The present invention addresses these and other problems associated with conventional hydrogen-powered vehicles and devices. Additional advantages and novel features of the present invention will be set forth as follows and will be readily apparent from the descriptions and demonstrations set forth herein. Accordingly, the following descriptions of the present invention should be seen as illustrative of the invention and not as limiting in any way.

SUMMARY OF THE INVENTION

The present invention includes a system for on-board hydrogen storage. The system has a storage system that includes a variable concentration slurry. The slurry stores a first concentration of a hydride hydrogen storage material in a carrier fluid. The storage system also includes a reactor that receives the slurry containing a second concentration of the hydride hydrogen storage material in the carrier fluid and reacts the slurry to release a concentration of hydrogen as a fuel.

In some embodiments, the storage system and the reactor are integrated.

In some embodiments, the reactor is a component of the storage system.

In some embodiments, the slurry storage system employs at least two different hydride concentrations. In some embodiments, the hydride storage system stores a slurry containing a high solids concentration and the reactor reacts a slurry containing a low hydride solids concentration where hydrogen is released. The high solids concentration slurry reduces weight and volume of solids in the storage system. In some embodiments, because diluent used to reduce solids concentration in the reactor is already hot from a previous recycle, heat-up time is reduced and the hydrogen release reaction proceeds more quickly. This approach also reduces the size of the reaction system. The hydride solids in the slurry produce hydrogen which results in a large increase in hydrogen pressure in the storage system. This increase in pressure can be used to facilitate separation between the solid and diluent liquid in the slurry. The presence of a low solids concentration slurry in the reactor during the reaction phase improves hydrogen release, improves flowability of the slurry, and controls reaction temperatures in the reactor, but is not intended to be limited. The presence of the low solids concentration slurry also facilitates separation of the hydrogen gas from the low concentration slurry.

In some embodiments, the system does not move the hydride storage material to a separate reactor, but propagates the reaction that releases hydrogen from the hydride slurry within a section of the hydride storage system. In some embodiments, the hydride is not moved once it is loaded on-board the vehicle or device.

In some embodiments, a variable concentration hydrogen storage system is characterized by at least one vehicle that receives a hydrogen storage material in a low concentration slurry and reacts the hydrogen storage material in a high concentration slurry in a fixed-bed reactor.

In some embodiments, a hydrogen storage system is characterized by at least one vehicle that receives a hydrogen storage material in a high concentration slurry and reacts the hydrogen storage material in a low concentration slurry in a flow-through reactor.

In some embodiments, the storage system reacts a hydride storage material in a fixed bed reactor.

In some embodiments, a hydrogen storage system is characterized by at least one vehicle that reacts a hydride hydrogen storage material in a fixed reactor bed.

In some embodiments, the slurry in the storage system has a concentration of the hydride storage material at least a factor of 3 greater or lower than the slurry in the reactor.

In some embodiments, the slurry in the storage system has a hydride concentration lower than the slurry in the reactor.

In some embodiments, the slurry in the storage system has a hydride concentration greater than the hydride concentration of the slurry in the reactor.

In some embodiments, the slurry in the storage system is a low concentration slurry with a concentration of the hydride storage material of from about 5 wt % to about 20 wt %. In some embodiments, the low concentration slurry includes a concentration of the hydride storage material of from about 10 wt % to about 30 wt %.

In some embodiments, the slurry in the storage system is a high concentration slurry with a concentration of the hydride storage material of from about 20 wt % to about 80 wt %. In some embodiments, the high concentration slurry includes a concentration of the hydride storage material of from about 30 wt % to about 80 wt %. In some embodiments, the high concentration slurry includes a concentration of the hydride storage material of from about 40 wt % to about 80 wt %.

In some embodiments, the slurry in the storage system contains a high concentration of the hydride storage material between about 40 wt % and about 80 wt % and the slurry in the reactor contains a low concentration of the hydride storage material between about 10 wt % and about 40 wt %.

In some embodiments, the storage system stores a slurry containing a low concentration of the hydride storage material between about 5 wt % and about 30 wt % and the reactor reacts the slurry containing a high concentration of the hydride storage material between about 30 wt % to about 80 wt %.

In some embodiments, the reactor includes one or more reactor sections that are thermally isolated from other sections of the reactor. In some embodiments, reaction of the hydride storage material in each section of the reactor occurs sequentially. In some embodiments, reaction of the hydride storage material in each section of the reactor occurs simultaneously as needed to maintain a reasonable hydrogen pressure within the system on-board the vehicle or device.

In some embodiments, the reactor is a counter-flow reactor which heats and reacts the slurry in a counter-flow direction. In some embodiments, the reactor is a co-flow reactor which heats and reacts the slurry in a co-flow direction. In the counter-flow reactor, coolant flows in a direction opposite the direction of the reactants. In the co-flow reactor, coolant flows in the same direction as the reactants.

In some embodiments, the hydrogen release reaction is exothermic so the reactor is cooled. In some embodiments, the hydrogen release reactions are endothermic so the reactor is heated. In various embodiments, the reactor can include a heat exchanger that allows the reactor to be heated or cooled as needed.

In some embodiments, hydrogen is released from the reactor on-board the vehicle by reacting at least a portion of a high hydride solids concentration slurry during the reaction phase.

In some embodiments, hydrogen is released from the reactor on-board the vehicle by reacting at least a portion of a low hydride solids concentration slurry during the reaction phase.

In some embodiments, the reactor is a flow-through reactor.

In some embodiments, the reactor is a fixed-bed reactor.

In some embodiments, the reactor includes one or more integrated tank portions configured to receive the slurry containing one or more different concentrations of the hydride storage material. In some embodiments, the one or more integrated tank portions include a porous filter portion disposed between adjacent tank portions allowing passage of the carrier fluid between the reactor sections that filters and adjusts concentration of the hydride storage material therein. In some embodiments, the one or more integrated tank portions are configured to release hydrogen sequentially to maintain hydrogen pressure within the system. In some embodiments, the one or more integrated tank portions are configured to release hydrogen simultaneously to maintain hydrogen pressure within the system.

In some embodiments, the reactor includes a heat exchanger that is centrally positioned between the one or more integrated tank portions to cool the hydrogen before it flows between the one or more integrated tank portions.

In some embodiments, the reactor is coupled to a hydrogen-powered device and releases hydrogen thereto for operation thereof.

In some embodiments, the slurry in the reactor is a low concentration slurry with a concentration of the hydride storage material of from about 5 wt % to about 20 wt %. In some embodiments, the low concentration slurry includes a concentration of the hydride storage material of from about 10 wt % to about 30 wt %.

In some embodiments, the slurry in the reactor is a high concentration slurry with a concentration of the hydride storage material of from about 20 wt % to about 80 wt %. In some embodiments, the high concentration slurry includes a concentration of the hydride storage material of from about 30 wt % to about 80 wt %. In some embodiments, the high concentration slurry includes a concentration of the hydride storage material of from about 40 wt % to about 80 wt %.

In some embodiments, the slurry in the reactor is a high concentration slurry with a hydride concentration of from about 20 wt % to about 80 wt % and the slurry in the storage system is a low concentration slurry with a hydride concentration of from about 5 wt % to about 20 wt %.

In some embodiments, the slurry in the reactor is a low concentration slurry with a concentration of the hydride storage material of from about 5 wt % to about 20 wt %. In some embodiments, the low concentration slurry includes a concentration of the hydride storage material of from about 10 wt % to about 30 wt %.

In some embodiments, the solid hydride storage material is recharged off-board the vehicle, e.g., in a service (forecourt) station, which reduces the mechanical equipment required for handling and transporting the hydrides storage material to and from the storage system on-board the vehicle or device. In some embodiments, the equipment that transfers the hydride solids to the storage system on-board the vehicle or device is provided at the service station.

In some embodiments, recharging includes transferring a slurry containing a low concentration of a hydride storage material from an off-board re-fueling (service) station and storing the slurry in a storage system onboard a vehicle or device to regenerate the hydride storage system on-board the vehicle or device.

In some embodiments, recharging includes transferring a slurry or paste containing a high concentration of a hydride storage material from a re-fueling (service) station and storing the slurry or paste in a storage system onboard a vehicle or device to regenerate the hydride storage system on-board the vehicle or device.

In some embodiments, the hydride storage material is transferred from a forecourt (service) station as a high concentration slurry or paste (e.g., as beads or powders comprised of the hydride storage material dispersed in a carrier fluid) or pneumatically in a gas and loaded onto the slurry storage system on-board the vehicle or device. By storing the solid hydrides absent the carrier fluid or gas, storage space required on board the vehicle is reduced. In some embodiments, once the hydride storage material is transferred in a high-concentration slurry or paste for storage, the slurry is reacted in the reactor on-board the vehicle as a low-concentration slurry.

In some embodiments, the hydride storage material is transferred and loaded onto (i.e., on-board) the vehicle from a forecourt service/regeneration station as a low concentration slurry (e.g., as beads or powders comprised of the hydride dispersed in a liquid) or pneumatically in a gas, which facilitates transport off-board and on-board the vehicle or device. In various embodiments, pumps, blowers and other conveyance systems and equipment provide transport of the hydride hydrogen storage material from the forecourt regenerating (service) station to the slurry storage system on-board the vehicle. The material can then be concentrated and stored as a high solids concentration slurry in the storage system on-board the vehicle.

In some embodiments, return of the liquid or gas transport medium to the service station ensures that the hydride storage material located on-board the vehicle has a high solids concentration that minimizes required storage space and mass. In some embodiments, as the slurries fill the storage system on-board the vehicle or device, the solid hydride is collected on a filter or screen or other support and the slurrying agent, carrier fluid, or other transport (conveyance) material (either liquid or gas) returns to the forecourt station.

In some embodiments, the hydride solids are stored in a low-concentration slurry once loaded on-board the vehicle. In some embodiments, the hydride solids are stored in a high-concentration slurry to reduce mass and volume in the storage system on-board the vehicle or device.

In some embodiments, the system includes multiple storage vessels containing a high hydrides solids concentration. This design further permits propagation of the exothermic reaction by allowing an entire isolated storage tank to react without requiring reaction rate control. One or more tank sections can be reacted as needed to produce the hydrogen required for the hydrogen powered device or vehicle and to maintain an overall system pressure.

In various embodiments, hydrogen-powered devices include, but are not limited to, e.g., fuel cells; electrochemical devices; electrical generators; temperature conditioning devices; cooling devices; heating devices; filtration devices; combustion engines; gas turbines; power generators; combustors for thermoelectric generators; material handling equipment (e.g., forklifts); airport baggage handling equipment; transport equipment; conveyors; lawn maintenance equipment (e.g., mowers, edgers, and trimmers); tillers; blowers; pumps; vacuum systems; components of these various devices; and combinations of these various devices and vehicles.

In various embodiments, hydrogen-powered vehicles include, but are not limited to, e.g., automobiles; buses; trucks; recreation vehicles; construction and landscaping vehicles (e.g., front-loaders) and equipment; material handling vehicles (e.g., forklifts) and equipment; airport tugs; recreation vehicles (e.g., golf carts) and equipment; including combinations of these various vehicles and equipment.

In some embodiments, a vehicle includes a hydrogen storage system characterized by a fixed bed reactor and a slurry storage system.

The present invention also includes a method for on-board storage of hydrogen for vehicles and devices. The method includes storing in a storage system a variable concentration slurry that includes a hydride hydrogen storage material suspended in a carrier fluid. The storage system stores the slurry containing a first concentration of the hydride storage material. Hydrogen is then released from the slurry in a reactor containing a second concentration of the hydride storage material as a fuel.

In some embodiments, the process includes storing hydrogen in the slurry containing a high concentration of the hydride storage material between about 20 wt % and about 80 wt %. In some embodiments, the process includes releasing hydrogen from the slurry containing a low concentration of the hydride storage material between about 5 wt % and about 20 wt %. In some embodiments, the process includes storing hydrogen in the slurry containing a low concentration of the hydride storage material between about 5 wt % and about 20 wt %.

In some embodiments, the process includes releasing hydrogen from the slurry containing a low concentration of the hydride storage material between about 20 wt % and about 80 wt %.

In some embodiments, the process includes releasing hydrogen by heating the slurry in the reactor at a temperature above about 60° C. In some embodiments, the process includes heating at least a portion of the slurry in the reactor at a temperature above about 100° C. for a time sufficient to release hydrogen at a selected rate.

In some embodiments, the process further includes delivering hydrogen released from the reactor to a vehicle or a device to fuel same.

In some embodiments, the process includes delivering hydrogen released from the slurry in the reactor to at least one vehicle or device to fuel the vehicle or the device.

In some embodiments, the hydride hydrogen storage material is a metal hydride, a chemical hydride, or a combination of a chemical hydride and a metal hydride.

In some embodiments, the carrier includes a liquid chemical hydride.

In some embodiments, the carrier fluid is an ionic liquid. In some embodiments, the ionic liquid is from the 1-ethyl-3-methylimidazolium [EMIM] class. Exemplary [EMIM] ionic liquids include, but are not limited to, e.g., $[EMIM]^+Cl^-$; $[EMIM]^+[BF_4]^-$; and $[EMIM]^+[CF_3SO_3]^-$. In some embodiments, the ionic liquid is from the 1-n-butyl-3-methylimidazolium [BMIM] class. Exemplary [BMIM] ionic liquids include, but are not limited to, e.g., $[BMIM]^+Cl^-$; $[BMIM]^+[BF_4]^-$; and $[BMIM]^+[CF_3SO_3]^-$. In other embodiments, other ionic liquids may also be used as will be selected by those of ordinary skill in the chemical arts. Thus, no limitations are intended.

In some embodiments, the carrier fluid includes a heat-transfer fluid. Heat-transfer fluids include, e.g., diphenyl oxide/biphenyl-based fluids, synthetic hydrocarbons, mineral oils, silicone oils, and combinations of these fluids.

In some embodiments, the carrier fluid is a gas. In various embodiments, the carrier gas can include hydrogen ($H_2$), helium (He), argon (Ar), nitrogen ($N_2$), carbon dioxide ($CO_2$), and combinations of these gases.

The purpose of the foregoing abstract is to enable the United States Patent and Trademark Office and the public generally, especially the scientists, engineers, and practitioners in the art who are not familiar with patent or legal terms or phraseology, to quickly determine from a cursory inspection the nature and essence of the technical disclosure of the application. The abstract is neither intended to define the invention of the application, which is measured by the claims, nor is it intended to be limiting as to the scope of the invention in any way.

A more complete appreciation of the invention will be readily obtained by reference to the following description of the accompanying drawings in which like numerals in different figures represent the same structures or elements.

DETAILED DESCRIPTION OF THE INVENTION

Figure 1:
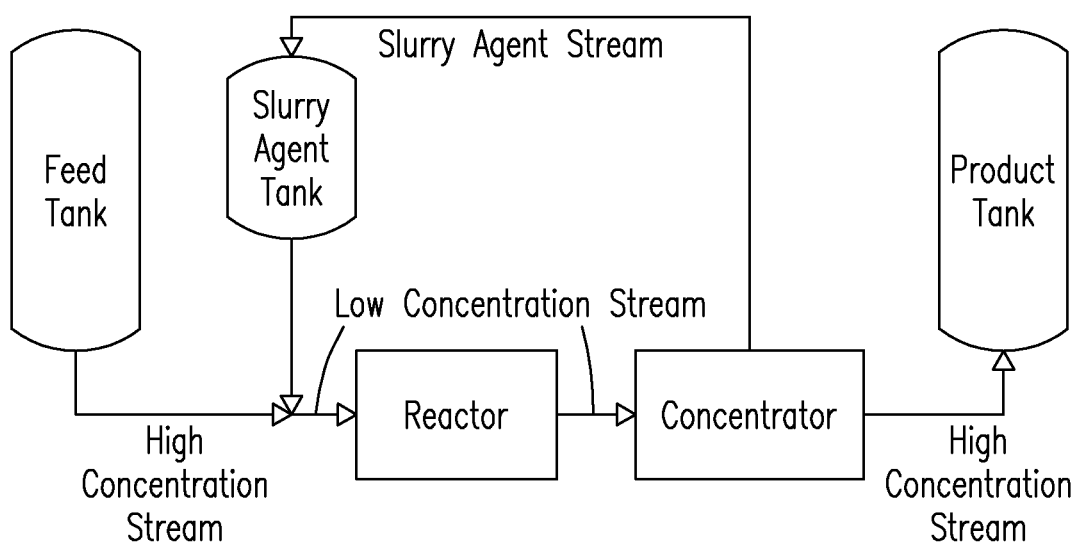
FIG. 1 shows an on-board hydride slurry storage system, according to one embodiment of the present invention.

The present invention includes a storage system and process for storage of hydrogen on-board hydrogen-powered vehicles and devices. The following description includes a preferred mode of one embodiment of the present invention. It will be clear from this description of the present invention that the invention is not limited to illustrated embodiments but that the present invention also includes a variety of modifications and embodiments thereto. Therefore the present description should be seen as illustrative and not limiting. While the present invention is susceptible of various modifications and alternative constructions, it should be understood, that there is no intention to limit the present invention to specific forms disclosed herein, but, on the contrary, the present invention is to cover all modifications, alternative constructions, and equivalents falling within the scope of the present invention as defined in the claims.

A system detailed further herein introduces novel elements including: (1) a storage system that stores a slurry containing a hydride (hydrogen) storage material. The storage system also serves as a reactor that releases hydrogen from the slurry. Conventional systems require movement of the hydride material to a separate on-board reactor; (2) in the present invention, the slurry containing the hydride storage material is a variable concentration slurry. Conventional systems maintain a single hydride solids concentration. In conventional systems where slurry solids are employed, slurrying agent is transported on-board and off-board through the reactor at the same concentration. In the present invention, the slurry containing a first concentration of hydride storage material is stored in the on-board storage system. A second concentration of the hydride storage material in the slurry is deployed in the reactor section. In some embodiments, a low concentration slurry is stored at the service station (forecourt) and a high concentration slurry is deployed into the reactor section. In some embodiments, a high concentration slurry is stored in the on-board storage system and a low concentration slurry is deployed in the reactor section. In some embodiments, a low concentration slurry is used when transferring slurry to and from the on-board storage system and a high solids concentration is used for reaction. In other embodiments, a high concentration slurry may be used when transferring slurry to and from the on-board storage system and a low solids concentration may be used for reaction; and (3) the reactor of the present invention propagates the hydrogen generation reaction within a thermally isolated section of the storage system where all the hydrogen can be released. In conventional flow reactor systems, hydride material flows through the reactor at low feed rates, which limits the quantity of material being reacted and thus limits the release of hydrogen. And, in these conventional systems, while high concentration solids (60 wt %) may be used, the amount of inert material that is stored and transported in the vehicle is minimized, resulting in a slurry that is difficult to pump, which leads to erosion of system piping and difficulty in separating hydrogen from the slurry. And, despite the high solids concentration, the overall system size remains large because pumps, phase separators, feed tanks, and product tanks are all required. The present invention eliminates need for ancillary equipment typical of conventional systems.

FIG. 1 shows one embodiment of an on-board hydride slurry storage system. The system employs a slurry with two different concentrations of the hydride hydrogen storage material. In some embodiments, the feed tank contains a slurry at a first (e.g., high) concentration of the hydride hydrogen storage material that is delivered to a reactor, e.g., a flow through reactor. A slurrying (slurry) agent is mixed into the high concentration slurry delivered from, e.g., a slurry agent tank, to yield a second (e.g., low) concentration of the hydride hydrogen storage material in the slurry, which slurry is introduced into the reactor. In the reactor, the hydride hydrogen storage material in the slurry releases hydrogen. Hydrogen from the reactor may then be used to fuel a selected device or vehicle (not shown). Spent slurry from the reactor is then delivered as a low concentration slurry stream (spent) to a concentrator, where the slurry agent is removed from the slurry and cycled back to the slurry agent tank where it may be reused in a subsequent hydrogen generation cycle. Removal of slurrying agent concentrates the spent slurry, producing a stream of high concentration slurry (spent), which is stored in another tank, e.g., a product tank. In the instant embodiment, the feed tank that delivers the slurry containing fresh or full-strength hydride hydrogen storage material is separated from the product tank that stores the concentrated (or second concentration) (or spent) form of the hydrogen storage material, but is not limited thereto as discussed further herein.

Figure 2:
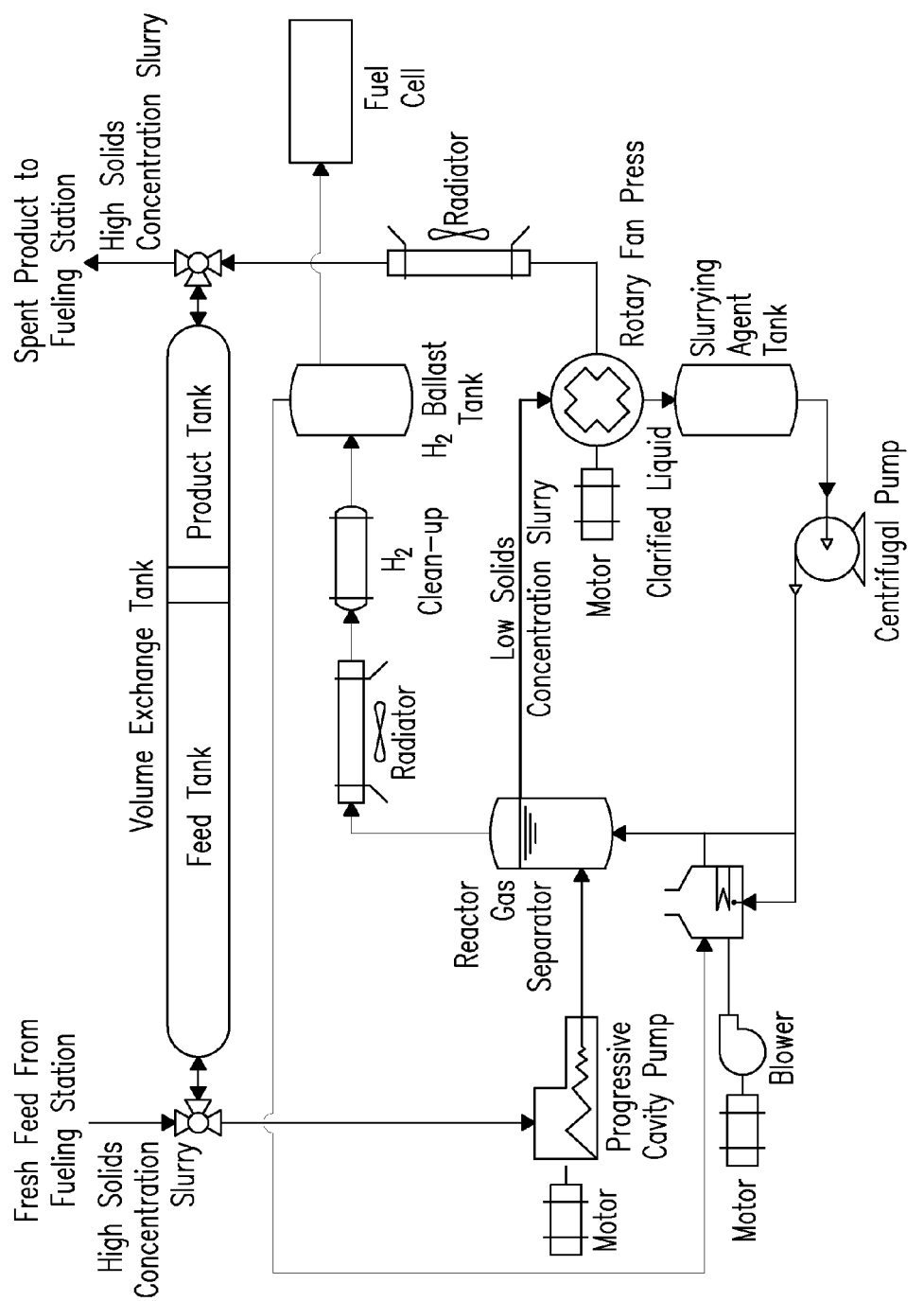
FIG. 2 shows an on-board hydride slurry storage system, according to another embodiment of the present invention.

FIG. 2 shows an on-board hydride slurry hydrogen storage system according to another embodiment of the present invention. In the figure, an integrated Feed/Product Tank receives a slurry containing a first (e.g., high) concentration of the hydride hydrogen storage material. In the present embodiment, the Feed/Product tank includes a moveable piston or moveable separation wall that separates the Feed Tank section from the Product Tank section. In operation, the high solids concentration slurry is transported on board the vehicle into the volume exchange tank as a paste. The moveable separation wall between the feed section and the product section of the tank. As the feed tank is filled, the product is pushed out of the tank and back to the fueling station. The moveable separation wall provides a variable holding capacity for each tank section depending on the demand for each type of slurry in the tank. During operation, the high solids concentration slurry is pumped out of the feed tank and into the reactor with a pump, e.g., a progressive cavity pump, which is not limited. The high solids concentration slurry is blended with a slurrying agent to reduce its concentration and introduced to the reactor. If the slurrying agent is hot, as it will be after start-up, temperature of the slurry increases. The slurry is then reacted in the reactor and hydrogen gas is separated from the liquid phase. Gaseous hydrogen is then cooled, and any impurities removed from the gas, and the cleaned gas is stored as a fuel gas, e.g., in a ballast tank. The low solids concentration slurry is then concentrated. In this embodiment, it has been shown as a rotary fan press, but other separation techniques are available. Once the slurrying agent is removed from the slurry, the slurry has a high solids concentration. The high solids concentration slurry is cooled and transferred into a product tank and stored. As will be understood by those of ordinary skill in the art, location and sequence of radiators, $H_2$ clean-up tanks, and $H_2$ ballast tanks are not limited. All configuration as will be implemented by those of ordinary skill in the art in view of the disclosure are within the scope the invention. No limitations are intended.

The slurrying agent that is separated from the reacted slurry is collected and recycled back with the feed material to produce an unreacted low solids concentration stream. During start-up, this stream may need to be heated to initiate the hydrogen thermolysis reaction.

In some embodiments, the slurry in the Feed Tank section is a high concentration slurry or high concentration paste. The term "high" as used herein is defined by a concentration of the hydride storage material in the slurry or paste greater than or equal to about 20% by weight. In some embodiments, the concentration of hydride storage material in the slurry or paste is up to about 80% by weight. Use of a high concentration slurry or paste can reduce the size needed for both the feed tank section and the product (storage) tank section, providing an advantage over other approaches in the art.

When ready for use, the high concentration paste/slurry is pumped (e.g., by a progressive cavity pump) into a reactor where the slurry is blended with a volume of a hot carrier fluid, diluent, or other slurrying agent that yields a slurry with a low concentration of the hydride storage material. As used herein, the term "low" means a concentration of the hydride storage material below about 30% by weight in the slurry, but slurry concentrations are not intended to be limited thereto. In some embodiments, the low concentration slurry comprises a hydride concentration below about 10% by weight in the slurry. In some embodiments, the diluent is an oil including, but not limited to, e.g., silicone oil and mineral oil. Other slurrying agents described herein may also be used. Pumps used in conjunction with the invention are not intended to be limited. In the present embodiment, the slurry reactor is preferably a flow-through slurry reactor, but is not intended to be limited thereto.

In the reactor, the low concentration slurry reacts to produce (release) hydrogen gas. The addition of hot diluent to the slurry before reaction in the reactor reduces the heat requirement needed to initiate reaction. In the illustrated embodiment, addition of heat to the reactor is provided by a hydrogen burner fed by hydrogen stored within a hydrogen tank (e.g., a hydrogen ballast tank) or other hydrogen source. However, heat may also be provided by any suitable heat source. Thus, no limitations are intended. In the present embodiment, because the slurry in the reactor contains a reduced concentration of hydride solids, reaction heats do not create a large temperature increase/decrease, thereby permitting reaction temperatures to be more easily controlled. The presence of a lower slurry concentration in the reactor also facilitates gas/liquid separation of gaseous hydrogen from the slurry liquid. As shown, one or more slurry reactors may be deployed to generate hydrogen. Excess heat from the reactors may be diverted to other locations within the system to heat diluents, to equalize temperatures, or to exchange heat, e.g., in concert with heat exchangers. Or, heat may be released from the system, e.g., in concert with radiators and/or other heat releasing means, as shown. No limitations are intended.

Once hydrogen release from the slurry in the reactor is complete, the dilute (low-concentration) slurry is filtered from the carrier liquid (diluents), to create a high concentration slurry that is then stored in the product tank at a reduced volume. Carrier fluid, diluents, or slurrying agents may be separated from the slurry in concert with, e.g., presses (e.g., rotary fan presses), separators (e.g., vortex separators), concentrators, other separation means, including combinations of these devices. The separated diluent (filtrate) is cooled (or heated) as required and recycled. Temperature of the recycled diluent can be adjusted prior to reuse. The product tank containing spent slurry may be stored until the feed tank is recharged with fresh slurry, at which time, slurry within the product tank is emptied or released to be recycled.

The on-board storage system of the present invention coupled to hydrogen-powered devices and hydrogen-powered vehicles to provide hydrogen fuel that fuels these devices and vehicles. All hydrogen-powered devices and vehicles as will be envisioned or implemented in view of the disclosure are within the scope of the present invention. No limitations are intended.

Figure 3:
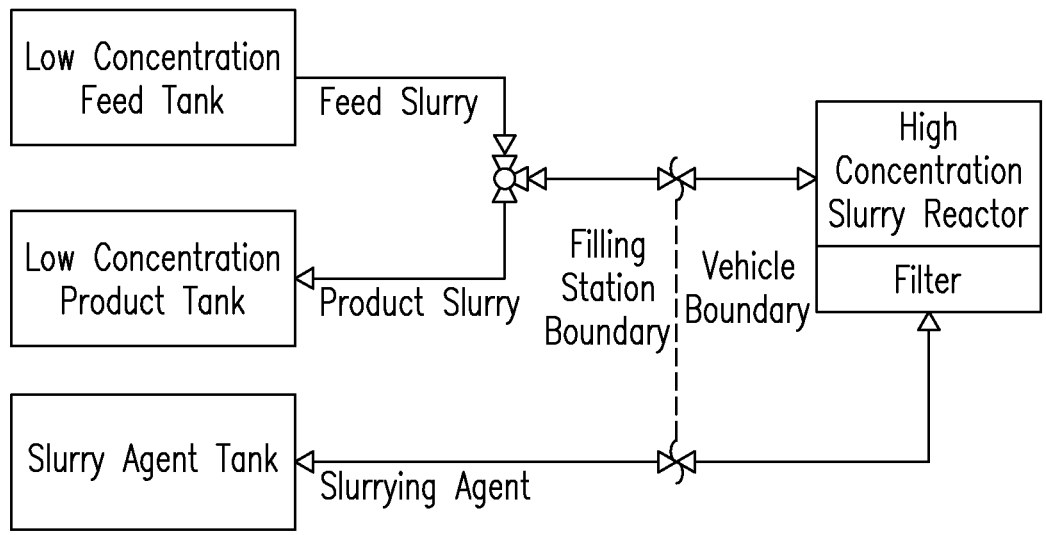
FIG. 3 shows an on-board hydride slurry storage system and an off-board refueling station for recharging the on-board hydride slurry storage system, according to another embodiment of the present invention.

FIG. 3 shows an on-board storage system that couples to an off-board (forecourt) refueling station that refuels (regenerates) the on-board storage system with hydride slurry. In the figure, a slurry containing a low concentration of hydride storage material moves the solid storage material on-board and off-board the vehicle. The low concentration slurry (feed) is pumped from the service station through a valve (e.g., a three-way valve) and into the high concentration slurry reactor and filter system. Carrying fluid or slurrying agent may be selectively removed from the reactor and transferred back to the refueling station as needed, while the hydride storage material solids are concentrated in the reactor. After the vehicle leaves the refueling station, reaction of the material in the reactor is initiated. With an exothermic reaction, the reaction front can propagate through the high concentration slurry bed and produce hydrogen. The generated hydrogen passes through the porous walls of the reactor and through a central heat exchanger described hereafter before being distributed between the various reactor sections. When the vehicle requires refueling, slurrying agent is pumped backwards through the porous walls and into the slurry. This fluidizes the spent slurry and results in a low concentration product that can easily be moved off-board the vehicle, e.g., to the refueling station.

Figure 4:
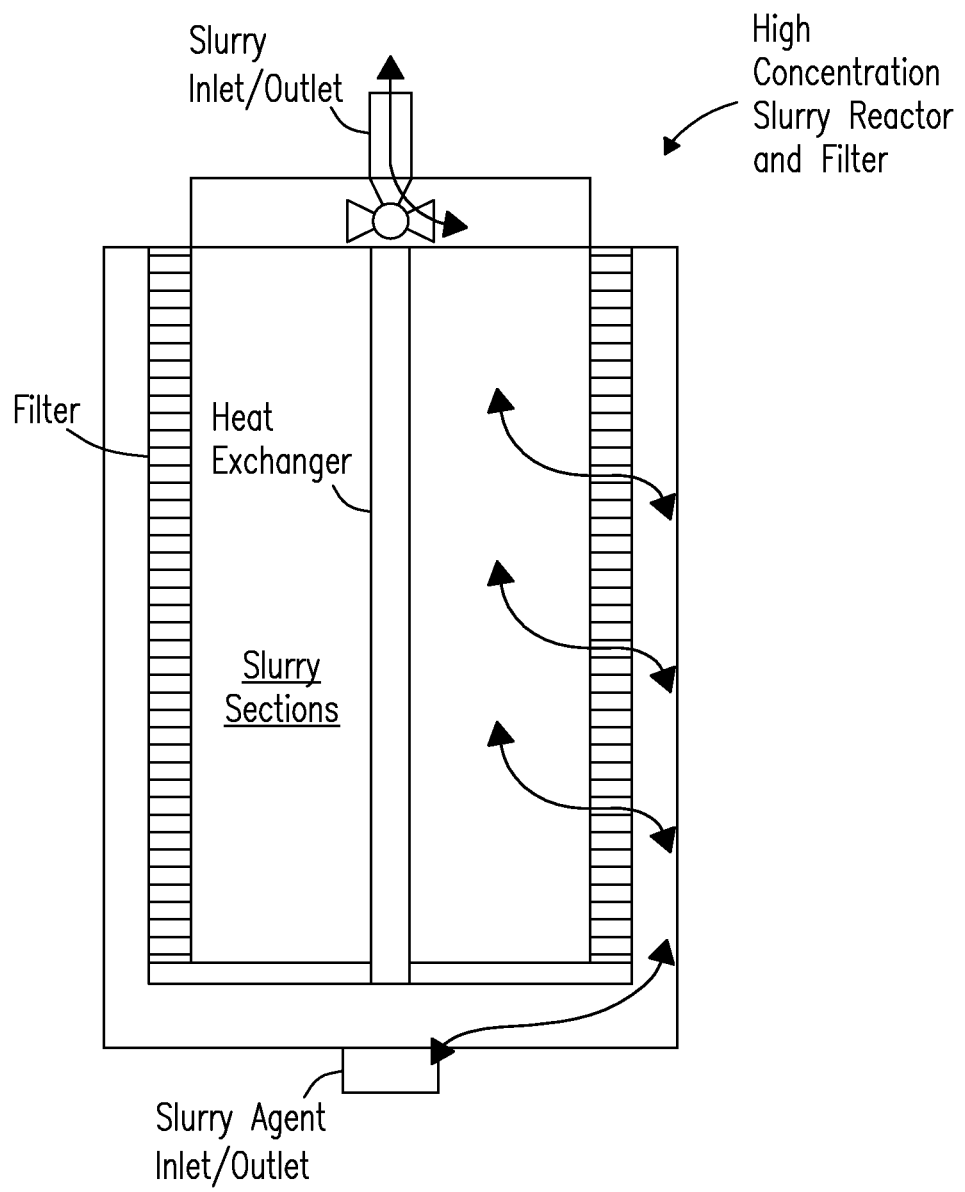
FIG. 4 shows a cross-sectional view of a hydride slurry reactor for generation of hydrogen in concert with another embodiment of the present invention.

FIG. 4 shows a cross-sectional view of a hydride slurry reactor of a fixed-bed type. The reactor is made of materials including, but not limited to, e.g., metals (e.g., steel, aluminum), ceramics, high-temperature polymers, including combinations of these materials. The reactor includes one or more thermally isolated tank portions (tanks) or sections also made of metals (e.g., steel, aluminum), ceramics, high-temperature polymers, or combinations of these materials. Each of the tank sections is filled with the hydride hydrogen storage material (e.g., metal and/or chemical hydride solids). A fill port(s), distribution valve(s), or other distribution mechanism(s) positioned (e.g., atop or elsewhere) on the reactor distributes the slurry containing the hydride storage material into individual tank sections. A hydrogen check valve(s) ensures that hydrogen gas does not leak from tanks of the reactor. Each tank section includes a porous wall made of a porous material (filter) positioned inside the outer wall that distributes the slurrying (carrier) agent to manage quantity and concentration of the hydride storage material in the slurry. Slurrying agent flows dynamically into or out of the reactor as necessary. Slurry in each tank section can also be reacted individually, sequentially, or simultaneously to generate hydrogen gas. Upon reaction, hydrogen gas can be distributed and released from one or more of the tank sections sequentially or simultaneously. A heat exchanger positioned centrally within the reactor cools the hydrogen before it is distributed to the various tank sections, and to other equipment components within the on-board storage system.

Figure 5:
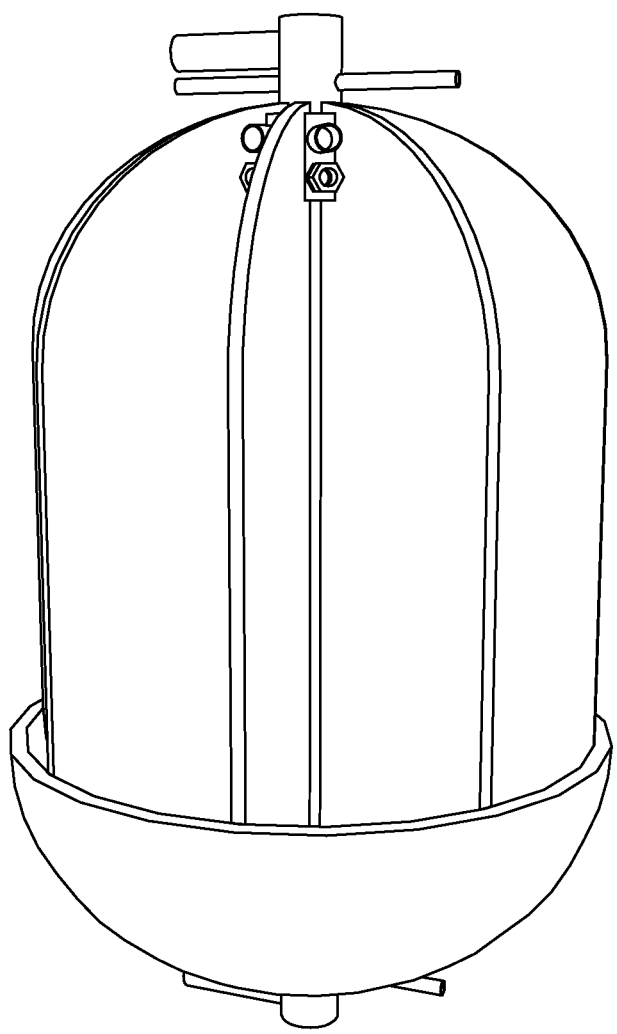
FIG. 5 shows a perspective view of the hydride slurry reactor of FIG. 4.

FIG. 5 shows a perspective view of the fixed-bed slurry reactor described previously in reference to FIG. 4. The slurry reactor may be used both in a high solids or low solids concentration mode. No limitations are intended. In the figure, slurry enters through the top of the reactor, but is not limited. A distribution valve or other distribution mechanism positioned (e.g., atop or elsewhere) on the reactor distributes the slurry into one or more tank sections. Walls of the reactor are composed of metals (e.g., steel, aluminum), ceramics, high-temperature polymers, or combinations of these materials. Walls between the individual tank sections are porous. Pores are of a size that permits release or introduction of the slurrying agent between the various tank sections that further allows retention of the hydride storage material solids. The porous walls thus act as filtering elements that serve to concentrate the slurry inside the reactor. In some embodiments, pores are smaller than the smallest expected particle size of the hydride storage material in the slurry. In some embodiments, slurry particles have a size between about 30 μm and about 100 μm. In some embodiments, slurry particles have a size below about 30 μm. In some embodiments, slurry particles have a size greater than about 100 μm. In some embodiments, a larger wall pore size enhances the filtering capacity between the tank sections of the reactor. No limitation is intended for the size of pores or the particle size of the hydride storage material.

In some embodiments, in low concentration mode, the slurry containing a low concentration of the hydride storage material solids pressurizes individual tank sections, and the slurrying agent flows out of individual tank sections through a porous wall positioned inside an outer exterior reactor wall. Concentration of the slurry is then managed by moving slurry agent into or out of the various sections of the reactor. In the figure, slurrying agents drain or enter from the bottom of the reactor, but reactor configurations are not intended to be limited thereto.

In some embodiments, in high concentration mode, the slurry containing a high concentration of hydride solids pressurizes individual tank sections of the reactor. Concentration of the slurry is then managed by moving slurry agent into or out of the various sections of the reactor. In operation, during the reaction phase, hydrogen gas flows out of the reactor through a centralized heat exchanger that cools the hot hydrogen gas before the gas pressurizes other sections of the on-board storage system prior to use in the vehicle or device.

Hydride Storage Materials

Hydride storage materials of the present invention include chemical hydrides, metal hydrides, and combinations or composites of chemical and metal hydrides, and/or other materials. Chemical hydrides suitable for use with the present invention include, but are not limited to, e.g., ammonia boranes, other boranes comprising various R-groups or side-chain substituent groups, lithium borohydride (LiBH$_4$), lithium amidoborane (LiNH$_2$BH$_3$), sodium amidoboranes (e.g., NaNH$_2$BH$_3$ and NaLi NH$_2$BH$_3$), N-ethyl carbazoles (C$_{14}$H$_{13}$N), alanes (e.g., XH$_3$, where X is any metal), CBN materials (e.g., R—NH$_2$BH$_3$, where R is any carbon-containing group (e.g., CH$_3$) including combinations of various chemical hydrides. Ammonia borane (AB=NH$_3$BH$_3$) is a preferred chemical hydride due to its high hydrogen content (about 19.6 wt %).

Metal hydrides suitable for use with the present invention have the following form:

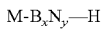

Here, M represents a metal or other selected element, B represents boron, N represents nitrogen, and H represents hydrogen. In various embodiments, M is selected from: lithium (Li), calcium (Ca), magnesium (Mg), sodium (Na), potassium (K), titanium (Ti), nickel (Ni), iron (Fe), including combinations of these various metals and elements. In some embodiments, M may also include other first-tier (first row) transition metals. In the formula, "x" and "y" have values in the range from 0 to 1. Metal hydrides are reversible and don't require off-board regeneration since they don't undergo atom re-arrangement when cycled. In these hydrides, hydrogen (H) moves in and out of the compound lattice. Metal hydrides also yield slurries that are pumpable, rendering slurries containing these hydride materials suitable for on-board use.

Composite hydrides can also be used with the invention. Composite hydride materials include various combinations of chemical hydrides, metal hydrides, and/or compounds containing nitrogen (N) and boron (B), and/or other materials. Exemplary composite hydride materials include, e.g., borohydrides (BH$_4^-$)+amides (e.g., R—R'—NCO—R")+metal hydrides; borohydrides+ammonia boranes (H—R—BNH—R'); lithium borohydride (LiBH$_4$), calcium borohydride [Ca(BH$_4$)$_2$], lithium nitrohydride (LiNH$_2$), and like materials. Composite hydride materials undergo significant atom rearrangement during hydrogen cycling. Complex metal hydrides are also characterized by their slow kinetics or significant atom rearrangement during hydrogen cycling. In operation, these compounds are preferably regenerated off-board due to their slow regeneration (re-hydrogenation) kinetics, high regeneration temperatures, and high regeneration pressures. However, complex metal hydrides are appealing in that dehydrogenation kinetics can be rapid, at least at elevated temperatures. All complex metal hydrides having a form suitable for use in a pumpable slurry can be used in concert with the present invention.

Concentrations of Hydride Solids

Hydride slurries and pastes of the present invention include chemical hydrides (CH), metal hydrides (MH), and composite hydrides described herein at concentrations preferably between about 10 wt % and about 80 wt %. The term "weight percent" (wt %) when used herein to describe slurry compositions is defined by the ratio of the mass of the hydride solids divided by the combined mass of the solid and the mass of the carrier fluid, written as a percent. Thus, a 30 wt % slurry means 30 grams of a selected hydride solid (e.g., 30 grams AB solid) divided by the combined weight of the solid and the carrier fluid (e.g., 30 grams AB+70 grams of silicone oil), written as a percent (i.e., 30 wt %). The term "weight percent" (wt %) when used herein to describe hydrogen release from a slurry is defined as the mass of hydrogen released divided by the original mass of hydride solid (e.g., AB solid), written as a percent. Thus, a 30 wt % release of hydrogen from the slurry means (e.g., 30 grams of hydrogen divided by 100 grams of AB solid), written as a percent (i.e., 30 wt %).

In some embodiments, low concentration slurries include concentrations of hydride storage materials between about 5 wt % and about 20 wt %. In some embodiments, low concentration slurries include concentrations of the hydride storage materials between about 10 wt % and about 30 wt %. In some embodiments, high concentration slurries include concentrations of hydride storage materials between about 20 wt % and about 80 wt %. In some embodiments, high concentration slurries include concentrations of hydride storage materials between about 30 wt % and about 80 wt %.

Generally, slurries containing hydride solids retain their slurry solid form following release of hydrogen, demonstrating the utility of slurries for movement and release of hydride storage materials for on-board hydrogen storage. In some embodiments, the slurry includes a concentration of an AB hydride storage material up to about 60 wt %. In some embodiments, concentration of the AB hydride storage material in the slurry is up to about 80 wt % in AB. In some embodiments, concentration of metal hydrides (MH) in the slurry is up to about 70 wt %. In some embodiments, concentration of metal hydrides (MH) in the slurry is up to about 80 wt %. In some embodiments, concentration of metal hydrides (MH) or (AB) in the slurry is up to about 80 wt %. In some low concentration slurries, concentration of metal hydrides (MH) or (AB) in the slurry is from about 10 wt % to about 40 wt %, but is not limited thereto. All chemical, metal, and composite hydride storage materials utilized in an on-board storage and reactor system at any concentration are within the scope of the invention. No limitations are intended.

Hydride storage materials in the slurries of the present invention are maintained at concentrations that maintains the suspension of solids during transport of the slurries on-board and off-board the vehicle or device. All concentrations of hydride solids that allow slurries to flow to required locations without losing hydride storage materials can be used without limitation.

Carriers

Carrier fluids are selected that suspend hydride solids in the slurries and retain the solids in the carrier fluid while slurries are transported, pumped, or otherwise delivered to the on-board storage system and/or to the reactor within the storage system (or during return delivery of spent slurries off-board the vehicles or devices). Carrier fluids include, but are not limited to, e.g., silicone oils (Sigma-Aldrich, St. Louis, Mo., USA), heat transfer fluids, ionic liquids, fluids containing carbon-boron-nitrogen (CBN) compounds, slurrying agents, mineral oils, tetrahydrofuran (THF), water, organic liquids, gases, and combinations of these various fluids. TABLE 1 lists selected physical properties for exemplary silicone oils.

TABLE 1

Physical properties of selected silicone oils.

| CARRIER | COMPOSITION/ FORMULA | CAS No. | DENSITY (g/mL) at 25° C. | FLASH POINT (° C.)* | VISCOSITY (cP) at 25° C. |
|---|---|---|---|---|---|
| Silicone Oil | [—Si(CH$_3$)$_2$O—]$_n$ containing Poly(methylphenyl siloxane) | 63148-58-3 | 1.05 | 230 to ~315 | ~100 |
| Silicone Oil | [—Si(CH$_3$)$_2$O—]$_n$ | 63148-58-3 | 1.01 | 232 (good thermostability from −50 to ~230) | ~20 |
| Silicone Oil | [—Si(CH$_3$)$_2$O—]$_n$ containing Poly(di-methyl siloxanes | 63148-62-9 | 0.91 | 135 (MP: −55) (BP: 140) | ~5 |

*Flash point as defined herein in reference to volatile liquids is the lowest temperature at which the liquid can vaporize to form an ignitable mixture in air.
MP = melting point.
BP = boiling point.

Heat transfer fluids include, e.g., liquid-phase heat transfer fluids (Radco Industries, Inc., La Fox, Ill., USA); heat transfer fluids containing eutectic mixtures (e.g., XCELTHERM® MK1 containing a stable eutectic mixture of 73% Diphenyl Oxide and 27% Biphenyl); heat transfer fluids containing substituted aromatics (e.g., XCELTHERM®HT); and heat transfer fluids containing synthetic hydrocarbons (e.g., XCELTHERM® HTR containing >50% Paraffinic white mineral oil+<50% substituted aromatics). TABLE 2 lists physical properties of exemplary heat transfer fluids.

TABLE 2

Physical properties of selected heat transfer fluids.

| CARRIER | COMPOSITION/ FORMULA | CAS No. | DENSITY (g/mL) at 25° C. | FLASH POINT (° C.) | VISCOSITY (cP) at 25° C. |
|---|---|---|---|---|---|
| XCELTHERM ® MK-1 | 73% Diphenyl Oxide + 27% Biphenyl | 101-84-8/ 92-52-4 | 0.97 | 124 (BP: 257) | 3.5 |

TABLE 2-continued

Physical properties of selected heat transfer fluids.

| CARRIER | COMPOSITION/ FORMULA | CAS No. | DENSITY (g/mL) at 25° C. | FLASH POINT (° C.) | VISCOSITY (cP) at 25° C. |
|---|---|---|---|---|---|
| XCELTHERM ® HT | 100% Alkyl and/or Substituted Aromatics | 29589-57-9 | 0.99 | 160 (BP: 280) | n/a |
| XCELTHERM ® HTR | >50% Paraffinic white mineral oil + <50% substituted aromatics | 8042-47-5/ 29589-57-9 | 0.89 | 200 (BP: 280) | n/a |

BP = boiling point.

Exemplary ionic liquids include, but are not limited to, e.g., ionic liquids from the 1-ethyl-3-methylimidazolium [EMIM] and 1-n-butyl-3-methylimidazolium [BMIM] classes. Exemplary [EMIM] liquids include, but are not limited to, e.g., [EMIM]$^+$Cl$^-$; [EMIM]$^+$[BF$_4$]$^-$; and [EMIM]$^+$[CF$_3$SO$_3$]$^-$. [BMIM] liquids include, but are not limited to, e.g., [BMIM]$^+$Cl$^-$; [BMIM]$^+$[BF$_4$]$^-$; and [BMIM]$^+$[CF$_3$SO$_3$]$^-$. Other ionic liquids may also be used as will be selected by those of ordinary skill in the chemical arts. Thus, no limitations are intended.

Carrier fluids may also be selected from the carbon-boron-nitrogen (CBN) compound and material classes. Among this class of compounds and materials are chemical hydride liquids. Exemplary chemical hydride liquids are shown hereafter (e.g., [1] and [2]), but liquid chemical hydrides are not intended to be limited thereto:

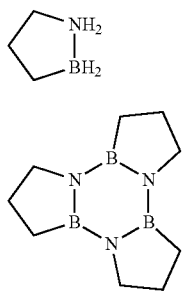

[1]

[2]

Liquid chemical hydrides (CH) as carrier fluids have an advantage in that both the carrier liquid and the hydride solids in the slurry all release hydrogen.

Gases suitable for use include, but are not limited to, e.g., hydrogen (H$_2$), helium (He), argon (Ar), nitrogen (N$_2$), carbon dioxide (CO$_2$), and combinations of these various gases. Inert gases are preferred.

Viscosity

Slurries of the present invention have viscosities that vary depending the components and constituents in the slurries. Viscosities are not limited provided the slurries can flow, or be transported with the hydrides storage materials suspended. Preferred viscosities are in the range from about 5 Centipoise (cP) to about 1,000 Centipoise. In some embodiments, slurry viscosities are selected between above 5 cP. In some embodiments, slurry viscosities are selected below 1000 cP. In some embodiments, slurry viscosities are selected between about 5 cP and 200 cP. In some embodiments, slurry viscosities are selected between about 20 cP and 1000 cP. No limitations are intended.

Slurry viscosities also depend in part on how the slurry is made. For example, in some embodiments described herein, slurries of the present invention are prepared by sonicating the various components of the slurry in combination with the carrier fluid. In some embodiments, hydride storage materials are sonicated, e.g., in a ultrasonic bath or via ultrasonic probes/horns to ensure solid particles are evenly dispersed into the carrier liquid. Sonication yields storage materials that have a high level of homogeneity at the atomic level. In some embodiments, sonication is used to provide the particle size of the hydride solids in the fluid phase of the slurry composition (e.g., nanoparticles) and achieve a homogeneous mixture of the hydride storage material and any other solids (e.g., surfactants and dispersants) in the carrier liquid. No limitations are intended.

Surfactants, Dispersants, and Stabilization Agents

Hydride storage materials of the present invention (e.g., chemical hydrides, metal hydrides, and composite hydride materials) may further include surfactants, dispersants, stabilization agents, dopants, and/or other additives, including combinations of these various additive compounds to enhance the properties of the slurry compositions in which the hydrides are prepared. For example, surfactants, dispersants, and stabilization agents aid the formation, stabilization, and flowability of the slurries containing hydride storage materials (e.g., chemical and/or metal hydrides) in their solid form prior to, and after release of hydrogen from the hydride materials in the slurry. In various embodiments, surfactants can be added to improve performance and suppress foaming in slurries containing hydride hydrogen storage materials. Preferred surfactants include, but are not limited to, e.g., TRITON® X-100 [C$_{16}$H$_{26}$O$_2$]$_n$ (Dow Chemical Co., Midland, Mich., USA); TRITON® X-102, an octylphenol ethoxylate (Dow Chemical Co., Midland, Mich., USA); TRITON® X-405, an octylphenol ethoxylate containing 70% surfactant (Dow Chemical Co., Midland, Mich., USA); TRITON® N-101, a polyoxyethylene branched nonylcyclohexyl ether (Sigma-Aldrich, St. Louis, Mo., USA); PLURONIC® F-68, an ethylene oxide/propylene oxide block copolymer (BASF, New Jersey, USA); PLURONIC® P-123, an ethylene oxide/propylene oxide block copolymer (BASF, New Jersey, USA); BRIJ® 30, a polyethylene glycol dodecyl ether [C$_{14}$H$_{16}$O$_2$], (Sigma-Aldrich, St. Louis, Mo., USA), including combinations of these compounds.

In some embodiments, surfactants have concentrations in the slurry of between about 1 wt % and 10 wt %. In slurries containing hydride storage materials of the ammonia borane (AB) class, potential for forming BN-polymer products that yield gel products rather than pumpable slurries is minimized by minimizing foaming in the slurries. In some embodiments, a surfactant concentration of about 5 wt % minimizes foaming in the slurry. Foaming can also be minimized by stirring (e.g., vigorously) or pumping the slurry at a rate that disengages hydrogen bubbles in the reactor such that they are released and dispersed into the slurry. TABLE 3 lists physical properties of selected surfactants.

In some embodiments, dispersants have a concentration in the slurry up to about 10% by weight. In other embodiments, dispersants have a concentration in the slurry between about 100 ppm and about 1000 ppm, but concentrations are not intended to be limited. In some embodiments, slurries containing a higher (>40 wt %) concentration (loading) of AB hydride storage materials (e.g., from about 50 wt % to about 70 wt %) include a concentration of dispersants and/or surfactants up to about 10 wt % to ensure the hydride storage material stays suspended in the slurry suspension, but concentrations of dispersants, surfactants, and other slurry components are not intended to be limited or required.

TABLE 3

Physical properties of selected surfactants.

| SURFACTANT | FORMULA | CAS No. | DENSITY (g/mL) at 25° C. | FLASH POINT | VISCOSITY (cP) at 25° C. |
|---|---|---|---|---|---|
| TRITON ® X-102 | $(C_2H_4O)_n C_{14}H_{22}O$ | 9002-93-1 | 1.07 | n/a (MP: 6) (BP: 200) | n/a |
| TRITON ® X-405 | n/a | 9036-19-5 | 1.096 | n/a | n/a |
| TRITON ® N-101 | $C_{19}H_{32}O_3$ | 123359-41-1 | 1.03 | 113 (MP: n/a) (BP: n/a) | n/a |
| PLURONIC ® F-68 | $(C_3H_6O \cdot C_2H_4O)_x$ | 9003-11-6 | 1.05 | 260 | 19 (77° C.) |
| PLURONIC ® P-123 | $C_5H_{10}O_2$ | 9003-11-6 | 1.04 | 231 | 390 |
| BRIJ ® 30 | $(C_2H_4O)_n C_{12}H_{26}O$ | 9002-92-0 | 0.95 | 113 (MP: 41~45) (BP: 100) | n/a |

MP = melting point.
BP = boiling point.

Dispersants keep solid hydride particles in the slurry from agglomerating. Dispersants may also be added to control interfacial tension and improve rheological properties of the slurry. Dispersants suitable for use with the invention include, but are not limited to, e.g., diglymes, tetraglymes, sulfolanes, dimethylformamides, diphenylethers, dimethylfurans, and combinations of these various dispersants. TABLE 4 lists physical properties of selected dispersants.

In some embodiments, metal halides (e.g., $CoCl_2$ and $FeCl_2$) are added as catalysts to the slurry solids to increase reaction rates.

All concentrations of surfactants, dispersants, dopants, and other additives as will be used by those of ordinary skill in the art in view of this disclosure are within the scope of the invention. No limitations are intended to exemplary materials only.

TABLE 4

Physical properties of selected dispersants.

| DISPERSANTS | FORMULA | CAS No. | DENSITY (g/mL) at 25° C. | FLASH POINT | VISCOSITY (cP) at 25° C. |
|---|---|---|---|---|---|
| Diphenyl ether | $C_{12}H_{10}O$ | 101-84-8 | n/a | 115° C. (MP: 25-26° C., BP: 258° C.) | n/a |
| Diglyme | $C_6H_{14}O_3$ | 111-96-6 | 0.937 | 57° C. (MP: −64° C., BP: 162° C.) | n/a |
| Dimethylformamide or dimethylfuran | $C_3H_7NO$ | 68-12-2 | 0.944 | 58° C. (MP: −61° C., BP: 153° C.) | 0.92 |
| Tetraglyme | $C_{10}H_{22}O_5$ | 143-24-8 | 1.009 | 266° C. (MP: −30° C., BP: 276° C.) | 4.1 |
| Sulfolane | $C_4H_8O_2S$ | 126-33-0 | 1.261 | 177 (MP: 27.5, BP: 285) | 10.07 |

MP = melting point.
BP = boiling point.

Hydrogen Release Rates

Hydrogen is released in the reactor at rates that depend on temperatures employed in the reactor and the duration of reactions at selected reaction temperatures, as will be appreciated and understood by those or ordinary skill in the mechanical arts. All reaction rates as will be implemented and tailored for on-board use by those of ordinary skill in the art in view of this disclosure are within the scope of the invention. No limitations are intended.

Loading and Removing Hydride Storage Material from the on-Board System

In some embodiments, recharging of the slurry on-board the vehicle or device includes transferring fresh slurry containing a low concentration of the hydride storage material from a re-fueling (forecourt) station into the storage system on-board the vehicle or device and storing the slurry on-board the vehicle or device. In some embodiments, the low concentration slurry in the storage system has a hydride concentration between about 5 wt % and 20 wt % solids. In some embodiments, the low concentration slurry in the storage system has a hydride concentration between about 10 wt % and 30 wt % solids. In some embodiments, in operation, the solids concentration of the slurry in the reactor is high. In some embodiments, the slurry in the reactor has a hydride concentration >20 wt % and below about 60 wt %. In some embodiments, the slurry in the reactor has a hydride concentration between about 40 wt % and below about 80 wt %. In these embodiments, hydrogen is released from the reactor on-board the vehicle by reacting at least a portion of the high solids concentration slurry during the reaction phase.

In some embodiments, recharging of the slurry on-board the vehicle or device includes transferring a fresh slurry or paste containing a high concentration of the hydride storage material from the re-fueling (forecourt) station and storing the slurry in a hydride storage system on-board the vehicle or device. In some embodiments, recharging includes transferring a slurry containing a high concentration of hydride storage material solids from an off-board storage system to an on-board storage system of the vehicle or device. In some embodiments, the slurry containing the high concentration of hydride storage material in the storage system has a hydride concentration >20 wt % and below about 60 wt %. In some embodiments, the slurry in the storage system has a hydride concentration between about 40 wt % and below about 80 wt %. Then, in operation, the solids concentration in the slurry in the reactor is low. In some embodiments, the slurry in the reactor has a hydride concentration between about 5 wt % and 20 wt % solids. In some embodiments, the slurry in the reactor has a hydride concentration between about 10 wt % and below about 30 wt %. In these embodiments, hydrogen is released from the reactor on-board the vehicle by reacting at least a portion of the low hydride solids concentration slurry during the reaction phase.

The following Examples provide a further understanding of the invention.

EXAMPLE 1

Solids Suspension #1

Ammonia borane ($NH_3BH_3$, 97%) (AB) powder (Aviabor, Pepper Pike, Ohio, USA) was mixed at various solids concentrations up to about 40 wt % in selected carrier fluids. Carrier fluids included silicone oil (Alfa-Aesar, Ward Hill, Mass., USA), EXCEL HT® (Radco, LaFox, Ill., USA), and EXCEL HTR® (Radco, LaFox, Ill., USA). Silicone oil used had a viscosity of ~100 cP at 25° C. Particles of the AB powder were rapidly suspended in the various carrier fluids due to differences in densities between the AB (0.78 g/mL at 25° C.) and the carriers (0.97~1.07 g/mL at 25° C.). Slurries flowed properly at concentrations of AB up to about 30 wt % at the conditions tested.

EXAMPLE 2

Solids Suspension #2

Slurries were prepared containing AB hydride solids as in Example 1 at concentrations of 20 wt %, 30 wt %, and 40 wt %, respectively, which were sonicated for 1 hour with a tip-sonicator. Particle homogeneity was observed to affect suspension in the slurries. Although AB particles float in silicone oil (carrier) due to difference in densities between the AB particles and the carrier, homogeneous AB particles were well dispersed in the slurries, with no indication of phase separation in slurries at AB loadings exceeding 30 wt %. This implies a significant improvement of the suspension state for slurries containing homogeneous hydrides particles compared with slurries containing as-received AB solids, ball-milled solids, or sonicated solids. Finally, flowability of slurries after tip-sonication show considerable improvement in terms of compared to those after ball-milling. In slurries prepared in silicone oil carrier (100 cP viscosity at 25° C.) containing AB concentrations up to 40 wt %, sonication increased the time of suspension of AB solids, enhanced stability of the slurries, and improved fluid properties of the slurries. Sonication is highly beneficial for obtaining well dispersed slurries and suitable flowability for slurries with AB loadings up to 40 wt %.

EXAMPLE 3

Solids Suspension #3

Slurries were prepared as in Example 1 at AB loadings up to about 50 wt % in silicone oils with viscosities below 100 cP (e.g., 5 cP and 20 cP). AB slurries at these viscosities exhibit suitable properties even at the higher (>40 wt %) AB solids loadings.

EXAMPLE 4

Slurry Reaction Test #1

30 mL of a slurry containing 10 wt % to 30 wt % ammonia borane (AB) solids as the hydride storage material in a silicone oil carrier was introduced into a round bottom flask (reactor) fitted with a water condenser above the carrier liquid. Slurry was stirred (e.g., magnetically) at a rate between about 700 rpm and about 800 rpm and heated isothermally in an oil bath at either 90° C. or 150° C. A nitrogen ($N_2$) cover gas was fed into the reactor to eliminate any reactions of hydrogen with air. One equivalent of hydrogen (about 6.5 wt % hydrogen) was released from the slurry at 90° C. following dehydrogenation of the AB hydride storage material. Two equivalents of hydrogen (about 13 wt % hydrogen) was released from the slurry at 150° C. following dehydrogenation of the AB hydride storage material. Due to excessive foaming, 30 wt % samples did not maintain their slurry form following dehydrogenation.

EXAMPLE 5

Slurry Reaction Test #2

30 mL of a slurry containing 30 wt % to 40 wt % ammonia borane (AB) solids in a silicone oil carrier was mechanically stirred in the set-up of Example 1 at a rate between 100 rpm and 200 rpm. Slurry was heated as temperature was ramped from 80° C. to 150° C. at a rate of 5° C./hour. Under these conditions, the slurry maintained its slurry form following release of hydrogen (dehydrogenation). Dehydrogenation occurs slowly at 110° C. and more rapidly as temperature is increased. Foaming was eliminated at these conditions. At 90° C., one equivalent of hydrogen (about 6.5 wt % hydrogen) was released following dehydrogenation of the AB hydride storage material in the slurry. At 150° C., two equivalents of hydrogen (about 13 wt % hydrogen) was released following dehydrogenation of the AB hydride storage material in the slurry.

EXAMPLE 6

Reactor Propagation Test

A 2.5 g pellet of solid AB that contained methyl cellulose (~15 wt %) was loaded into a 1" diameter quartz tube column. A temperature-controlled soldering tip was inserted into the bottom of the AB. The soldering tip was heated to approximately 160° C. over the course of 392 seconds. Temperature measurements were collected by thermocouples positioned along the length of the column. IR imaging along the length of the column was also performed. Hydrogen released from the AB pellet was also measured. The reaction was shown to propagate from the bottom of the pellet (where the pellet was directly heated) through the rest of the pellet. And, the reaction was shown to propagate up the column. Direction is not limited. The reaction was sustainable even after heat was removed, validating the utility of the fixed-bed reactor design which relies on reaction propagation through a reactor section.

While exemplary embodiments of the present invention have been described herein, it is to be distinctly understood that this invention is not limited thereto but may be variously embodied to practice within the scope of the following claims. It will be apparent to those skilled in the art that many changes and modifications may be made without departing from the invention in its true scope and broader aspects. The appended claims are therefore intended to cover all such changes and modifications as fall within the scope of the invention.

What is claimed is:

1. A method for on-board storage and release of hydrogen, the method comprising the steps of:
    storing hydrogen in a hydride hydrogen storage material at a first concentration in an inert carrier fluid in a storage system;
    heating a second concentration of the hydride hydrogen storage material in the inert carrier fluid in a reactor to release hydrogen as a fuel therefrom; and
    filtering the inert carrier fluid released from the reactor in a separation device for reuse in the storage system and/or the reactor.

2. The method of claim 1, wherein the hydride storage material in the storage system has a concentration at least a factor of 3 greater or lower than the hydride storage material in the reactor.

3. The method of claim 1, wherein the storing includes storing hydrogen in a high concentration of the hydride storage material between about 20 wt % and about 80 wt % and the releasing includes releasing hydrogen from a low concentration of the hydride storage material between about 5 wt % and about 20 wt %.

4. The method of claim 1, wherein the storing includes storing the hydride storage material at a low concentration in the inert carrier fluid between about 5 wt % and about 20 wt % in a service (forecourt) station and the releasing includes releasing hydrogen from the hydride storage material at a high concentration in the inert carrier fluid between about 20 wt % and about 80 wt % in the reactor.

5. The method of claim 1, wherein the releasing includes releasing hydrogen by heating the hydride storage material in the reactor at a temperature above about 60° C.

6. The method of claim 1, further including delivering hydrogen from the reactor to a vehicle or a device coupled thereto to fuel same.

* * * * *